Patented Apr. 14, 1942

2,279,774

UNITED STATES PATENT OFFICE 2,279,774

COATED PRODUCT

Elmer K. Bolton, Wilmington, Del., assignor to E. I. du Pont de Nemours & Company, Wilmington, Del., a corporation of Delaware No Drawing. Application September 29, 1938, Serial No. 232,468

5 Claims. (Cl. 91—70)

This invention relates to the art of coating, and more particularly to the manufacture of coated products by fusion of a finely divided substance upon the surface of the object to be coated.

This invention has as an object the preparation of new and improved coatings of a protective and/or decorative nature over metal and ceramic-ware. A further object is a method for producing such coatings. Other objects will appear hereinafter.

These objects are accomplished by a process which comprises projecting a deposit of crystalline synthetic linear polymer in powdered or finely divided form upon an article of metal, ceramic-ware or the like, followed by fusion of the deposit. In the preferred embodiment of this invention, these objects are attained either by applying the deposit from an agitated sieve, or in the form of a water slurry, followed in either case by fusion of the deposit and subsequent efficient cooling.

The polymers used in the practice of this invention are the fiber-forming crystalline synthetic linear polymers which are described in Patents 2,071,250, 2,071,253, and 2,130,948, and which are further designated herein as polyamides or polymeric amides.

These polymers are obtained by the polymerization of suitable bifunctional reactants, the reaction being continued until a highly polymeric product is formed which is capable of being formed into useful filaments. By "cold drawing," these filaments are converted into oriented fibers. The polymers are not resinous but are microcrystalline in character as evidenced by the fact that they have rather sharp melting points and furnish X-ray diffraction patterns characteristic of crystalline materials. Filaments, films, ribbons, and the like made from these polymers are converted on application of tensile stress ("cold drawing") into oriented products which exhibit typical fiber X-ray diffraction patterns. The crystalline synthetic linear polymers with which this specification is principally concerned are polyamides. These polyamides contain a plurality of amide linkages as integral parts of the main chain of atoms in the polymer molecule.

While certain of these polymers may be easily applied as coating compositions by application from suitable solvents, others, selected for their superior qualities of toughness and strength, do not lend themselves readily to this conventional method of application because of their insolubility in the common solvents.

It has now been found that the crystalline synthetic linear polymers containing amide groups as integral parts of the chain which possess desirable qualities as coating compositions, may be applied over metal and ceramic-ware surfaces by fusing in situ a thin layer of powdered or finely divided polymer upon the metal or ceramic-ware surface, thereby covering the object concerned with a thin continuous layer of the polymer. Previous to the discovery that polymer coatings may be applied in this manner, these polymers, designated above, have been limited in their utility as coating materials by their insolubility in the common solvents. Therefore, it is now possible to apply coatings of unusual toughness, durability and high melting point to metal and ceramic-ware objects by a method which is rapid in comparison to the usual baking schedules required of the common organic finishes and which operates at low temperatures when compared to the firing temperatures required of vitreous enamels. Due to their brittle nature, conventional vitreous enamel coatings are readily susceptible to chipping or similar damage through mechanical shock or slight deformation of a coated metal sheet. However, coatings of crystalline synthetic linear polymers, applied to metal sheeting by the processes described in this invention, are unaffected even when subjected to the repeated blows of a hammer and retain their adhesion and continuity when the coated sheeting is caused to bend sharply. Furthermore, as the melting points of the crystalline synthetic linear polymers referred for use according to this invention are above 200° C., it is readily seen that these polymer coatings are stable at temperatures well in excess of those at which many of the conventional organic finishes soften or undergo thermal decomposition.

The term "finely divided" as used in this specification, is intended to refer to a powdered, flaky or granular substance which may be deposited upon a surface by any suitable means. The finely divided substances used in this invention are capable of being fused upon the surface, forming an adherent coating when cooled below the melting or softening point of said substance.

Among various methods for depositing a coating of powdered polymer upon a metal or ceramic-ware surface, the following may be mentioned. The polymer may be reduced to 40-mesh particle size or finer, and then sifted, as through a sieve, in such a manner as to deposit an even layer of powder of the desired thickness over the surface to receive the final polymer coating. This method is especially suitable for coating flat surfaces. For polymers, which will form stable suspensions in water when reduced to 150-mesh particle size or finer, it has been found convenient to apply such polymers in a water slurry either by spraying the slurry over the surface to be coated, or spreading it with a doctor knife. In either case it is desirable to dry the coating produced before fusion. The latter method is particularly useful for coating curved surfaces, or when much handling of the object is required before fusion of the coating, as these coatings deposited from a slurry may be handled with care without damage after drying.

With higher melting polymers, it is desirable to carry out the fusion step in a nonoxidizing atmosphere such as nitrogen or carbon dioxide, in order to avoid discoloration of the polymer due to oxidative degradation. While this requirement is of lesser significance when preparing clear or colored coatings, it is of great importance when the purpose of the operation is the production of a white finish.

The fusion of the coating may be carried out by any convenient means of transmitting heat to the coated object. As the temperature of fusion is chosen sufficiently high to cause rapid fusion to a liquid of minimum viscosity, and yet not high enough to initiate thermal decomposition of the polymer during the time necessary for fusion and flow-out, it is desirable to operate under conditions which favor a maximum rate of heat transfer into the coated article. For example, when fusing the coating upon the surface of a flat section of metal by heating in a muffle furnace, it is frequently desirable to place the object upon a large heavy steel plate previously brought to furnace temperature within the furnace. By doing so, the temperature of the metal object is caused to rise more rapidly, i. e., the rate of heat transfer is facilitated, than would be the case were the object placed on a refractory support.

In order to operate this invention to its fullest advantage, it is desirable to employ crystalline synthetic linear polymers possessing melting points above 200° C. Polyamides which melt above 200° C. are frequently less susceptible to most solvents than the lower-melting members of this class of crystalline synthetic linear polymers. Furthermore, due to their high melting points, they serve as stable coatings at temperatures considerably above those at which the conventional organic coatings are either fused or thermally decomposed. However, the lower-melting polyamides may be used to some advantage when coatings of unusual pliability or soft texture are desired or when the avoidance of the elevated temperatures associated with the application of higher-melting polyamides is of importance.

Representative of the polyamides useful according to this invention are:

| Polyamide | Melting point |
|---|---|
| | °C. |
| Polyhexamethylene adipamide | 254 |
| Polytetramethylene adipamide | 278 |
| Polyhexamethylene sebacamide | 213–215 |
| Polydecamethylene adipamide | 230 |
| Polyhexamethylene beta-methyl adipamide | 216–218 |
| Polydecamethylene para-phenylene diacetamide | 211–242 |
| Polypentamethylene terephthalamide | 315 |
| Polyhexamethylene pimelamide | 200–202 |
| Polymer prepared from epsilon amino caproic acid | 205–207 |

For the preparation of extremely tough coatings, crystalline synthetic linear polymers of good quality should be selected which have a high degree of polymerization. In other words, the intrinsic viscosity of the polymers should be above 0.4 and preferably above 1.0, where intrinsic viscosity (a measure of the molecular weight) is defined as given in the above mentioned Patent 2,130,948. The strength and toughness of the polyamides increase with the intrinsic viscosity. In general, crystalline synthetic linear polyamides having an intrinsic viscosity above 0.4 exhibit fiber-forming properties.

As colored or white coatings depend largely for their gloss, smoothness, and color intensity or whiteness, upon the extent to which the pigment is dispersed, especial care must be exercised during the preparation of the coating in order that this end may be achieved. In general, it may be said, that the highest dispersions in the fused coatings are obtained through the use of a coating prepared by intimately mixing the pigment with at least 150-mesh particle size polyamides.

In its preferred form, this invention is operated to include rapid cooling, preferably by quenching of the molten polyamide coatings subsequent to fusion. This tempering or quenching process leads to tougher coatings with improved adhesion and, in effecting rapid cooling, eliminates the necessity of retaining an inert atmosphere in contact with slow-cooling unquenched coatings.

The following specific examples illustrate the invention in greater detail.

Example I

Nine hundred seventeen (917) parts of hexamethylene diammonium adipate, 7.28 parts of adipic acid and 180 parts of water were placed in an autoclave and heated in a carbon dioxide atmosphere for 200 minutes, slowly raising the temperature from 222–274° C. When the gauge pressure within the autoclave reached 250 lbs., it was reduced slowly to atmospheric pressure by bleeding out water vapor and carbon dioxide. At the end of the heating schedule when the temperature of the charge had dropped to 270° C. a pressure of 125 lbs./sq. in. applied with carbon dioxide gas was used to force the charge out of the autoclave through a narrow slit into cold water. The 3 x 0.010 inch ribbon of polyhexamethylene adipamide so produced was reduced in a hammer mill to pass a 100-mesh screen. The intrinsic viscosity of this polymer was found to be 1.0 and its melting point was 254° C.

A portion of the powdered product was placed on an 80-mesh screen and by gentle tapping of the screen caused to sift through the latter depositing an even coat of polymer over the surface of a 4 x 5 inch steel plate previously cleaned by sanding. The plate was then placed in an electrically heated muffle furnace upon a 6 x 8 x 1 inch thick steel plate resting on the floor of the furnace. The heavy steel plate, maintained at the furnace temperature of 340° C., served as an aid to heat transfer in effecting rapid fusion of the coating. A constant flow of preheated carbon dioxide gas was supplied to the interior of the furnace to exclude oxygen from contact with the melting polymer. Thirty seconds within the furnace, followed by quenching in cold water, was sufficient to produce fusion and good flow-out of the powdered polymer. The coating thus formed was smooth, adherent, and extremely tough.

Example II

One thousand forty-eight (1048) parts of hexamethylene diammonium adipate, 15 parts of glacial acetic acid, and 187 parts of water were placed in an autoclave and heated in the absence of oxygen for one hour at 220° C. Although the pressure rose to 255 lbs. gauge, no water was bled out during the reaction. The product was removed and dried in a steam-heated oven for 12 hours. The dried material was easily reduced to 150-mesh particle size by suitable grinding and was found to possess an intrinsic viscosity of 0.4 and a melting point of 225° C.

This powdered polymer was found to form with water, in the ratio 1:7, a smooth, stable slurry corresponding in consistency to so-called "enamel-slips" used in wet process vitreous enameling practice. Using an ordinary paint spray gun, the slurry was sprayed evenly over the surface of several 2 x 2 inch cleaned brass plates. When the coatings were allowed to dry at 95° C., they could be handled without damage. The coatings were fused in two ways. Several of the plates were floated on a metal bath maintained at 285° C. for 15 seconds, while others were placed in an electrically heated muffle furnace at 335° C. for 2 minutes, followed in either case by quenching in cold water. In both procedures carbon dioxide gas was used to blanket the fusion and protect the molten polymer from oxygen. Attractive, glossy, and continuous coatings were obtained.

Example III

Thirty (30) parts of 40-mesh polyhexamethylene adipamide, 30 parts of 2,2-bis-parahydroxyphenyl propane, 28 parts of methyl alcohol, and 40 parts of water were combined in a flask equipped with a mechanical stirrer, reflux condenser, and thermometer immersed in the contents of the flask. The mixture, refluxing at 80° C., was heated and agitated for 24 hours, at the end of which time the powdered polymer was separated by filtration. After washing the polymer with 24 parts of methyl alcohol, it was dried at 100° C. under 15 mm. pressure. The weight of the recovered dried polymer was found to be 39.1 parts indicating that it had absorbed approximately 25 per cent, based on the final weight, of 2,2-bis-parahydroxyphenyl propane. The powder (melting point 230° C.) was then sieved through a 28-mesh screen depositing an even coat over the surface of a 2 x 2 inch sanded steel plate and subsequently the plate was floated upon a 310° C. metal bath for 20 seconds followed by quenching in cold water. It was observed that fusion and flow-out took place more rapidly than with pure unmodified polyhexamethylene adipamide and that the slow vaporization of the absorbed phenolic body tended to blanket the melt and prevent oxidative degradation due to the suddounding air. The coatings, thus obtained, were somewhat less hard than similar coatings of unmodified polyhexamethylene adipamide but at the same time possessed unusual qualities of toughness, clarity, and adhesion.

Example IV

Eight (8) parts of polyhexamethylene adipamide possessing an intrinsic viscosity of 0.4 and prepared according to Example II, and 2 parts of titanium dioxide pigment were ground together in a mortar to effect intimate mixing and finally sieved through a 100-mesh screen. The material was then placed in a tube and heated at 240° C. for three hours in the absence of oxygen. As no fusion or sintering took place during the heating, which was designed to raise the molecular weight of the polyhexamethylene adipamide in the solid state to the point where it would possess an intrinsic viscosity of approximately 1.0, the product could be easily handled in the subsequent operation of sieving. The powder was placed on a 100-mesh screen which was gently tapped in such a manner as to deposit an even coat of the powder over the surface of a 2 x 2 inch sanded steel plate. The plate was then floated for 30 seconds upon the surface of a 310° C. metal bath to effect fusion of the coating, then quenched in cold water. A stream of carbon dioxide gas was played over the surface of the metal plate during fusion to prevent discoloration due to oxidation. A tough coating of polymer was obtained possessing good qualities of smoothness and whiteness.

Example V

An interpolyamide was prepared by heating equimolecular quantities of hexamethylene diammonium adipate and decamethylene diammonium sebacate respectively at 198°–250° C. for 2 hours under conditions which permitted the removal of the water formed during the reaction. The product, having an intrinsic viscosity of 0.77, and melting point of 135°–140° C., was removed from the autoclave by extruding through a slit into cold water and subsequently reduced to a granular state of subdivision. The granular interpolyamide was then distributed over the surface of a 4 x 5 inch sanded steel plate and the latter floated upon a metal bath at 180° C. for 2 minutes followed by quenching in cold water. A smooth, continuous, and adherent coat possessing good gloss was thus obtained.

Example VI

A combination of 257.7 parts of adipic acid, 115.4 parts of ethylene glycol, 157.3 parts of hexamethylene diammonium adipate, and 50 parts of water was agitated with a slow stream of carbon dioxide gas and heated according to the following schedule: 20 hours at 150° C. and 1 atmosphere pressure; at 200° C. for 1 hour at atmospheric pressure, for 3 hours at 20 mm. pressure, for 20 hours at 2 mm. pressure; finally, heated 8 hours at 250° C. and 4 mm. pressure. The resulting interpolymer was extremely tough and possessed an intrinsic viscosity of 0.54, a melting point of 142° C. and a tensile strength of 4800 lbs./sq. in. determined upon a sheet. The massive polymer was cut into small pieces in mechanical cutters. The resulting particles were spread out as a layer upon the surface of a 4 x 5 inch sanded steel plate which was subsequently floated upon a 170° C. metal bath for 2 minutes in order to effect fusion of the particles. After quenching, a coating which was fairly thick, but adherent and possessing a good luster was obtained.

Example VII

A thin coating of 100-mesh polyhexamethylene adipamide was spread over a small square of porous plate. The plate was then floated upon a 345° C. metal bath in a carbon dioxide atmosphere for three minutes followed by cooling in a stream of carbon dioxide gas. An attractive, tough, and adherent coating or "glaze" of polyhexamethylene adipamide was thus obtained.

The foregoing examples illustrate the method for applying coatings of crystalline synthetic linear polymers to metal articles and ceramic-ware. A valuable class of polyamides, where polyamides are defined as crystalline synthetic linear polymers containing a plurality of amide linkages as integral parts of the atom chain, are those derived from diamides of the formula

and dicarboxylic acids of the formula

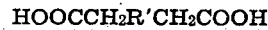

or amide-forming derivatives thereof in which R and R' are divalent hydrocarbon radicals free from olefinic and acetylenic unsaturation and in which R has a chain length of at least two carbon atoms. An especially valuable group of polyamides within this class is that in which R is $(CH_2)_x$ and R' is $(CH_2)_y$ where $x$ and $y$ are integers and at least 2. However, polyamides of other types are also useful, e. g., the polyamide derived from $\gamma, \gamma'$-diamino dipropyl ether and adipic acid. Furthermore, polyamides derived from polymerizable monoaminomonocarboxylic acids or their amide-forming derivatives such as caprolactam can be used as coating materials according to this invention. It is to be understood that the mention of the dibasic carboxylic acids and amino acids in the claims is intended to include the amide-forming derivatives of these acids as referred to above.

Instead of the polyamides mentioned above which are obtainable from bifunctional polyamide-forming reactants as essentially sole reactants, I may use the linear polyamides obtained by including with the polyamide-forming reactants used to prepare the polyamide other bifunctional reactants such as glycols and hydroxy acids. As examples of such modified polyamides may be mentioned those derived from diamines, dibasic acids and glycols; those derived from diamines, dibasic acids and hydroxy acids; those derived from amino acids, dibasic acids and glycols; and those derived from amino acids and hydroxy acids. Although these products contain ester linkages, they can still be referred to as polyamides since they contain a plurality of amide linkages and retain many of the desirable properties of the straight polyamides. Like the straight polyamides, these modified polyamides do not exhibit fiber-forming properties until their intrinsic viscosity is at least 0.4. Mixtures of preformed polyamides may also be used.

In addition to the methods already described for preparing polyamide coated objects, it should be noted that the operation as a continuous process of any or all of the steps comprising the preparation and application of a polyamide coating, as well as the fusion and quenching of the resultant coating upon the object concerned, are considered to fall within the scope of this invention. Such a process is especially adaptable to the continuous coating of metal sheeting. For example, a moving sheet of metal may be, first, passed under an agitated sieve which sifts a coating of polyamide upon the surface of the metal; secondly, led into a furnace in which the coating is caused to fuse in an inert atmosphere, such as carbon dioxide or nitrogen, and flow out to a continuous film; and thirdly, drawn out of the opposing side of the furnace into a bath of cold water to effect quenching.

It is sometimes desirable to apply the polyamide coating to a preheated metal or ceramic-ware surface for the purpose of minimizing the time necessary for fusion and flow-out of the polyamide coating. This is particularly desirable when coating ceramic-ware as the fusion of the polyamide coating customarily requires longer exposure to the source of heat in order to effect fusion of the coating.

The principal methods for applying and fusing the polyamide coatings have been mentioned. In general, the more finely divided the polyamide, the more easily it is applied. However, in view of their extreme toughness, high molecular weight polyamides resist the grinding action of a ball mill and require the more vigorous action of a hammer mill in order to be effectively reduced in particle size.

An additional method of obtaining finely divided polyamides for use according to this invention depends upon the fact that the molecular weight of a low intrinsic viscosity polyamide (intrinsic viscosity of 0.4 or less) may be raised without fusion by heating at a temperature slightly below its melting point for a period of ½ to 6 hours. Furthermore, since low molecular weight polyamides (those having an intrinsic viscosity of 0.4 or less) are more brittle, grinding proceeds much more readily and consequently polymers of this type may be easily reduced to 150-mesh particle size or finer. These characteristics of low molecular weight polyamides are utilized for the production of finely divided high molecular weight polyamides of intrinsic viscosity of from 0.4 to 2.0, in a process which consists in the "solid phase" polymerization of low molecular weight polyamides previously reduced to a particle size not easily attained by applying the conventional methods of grinding to high molecular weight polyamides.

The solid phase polymerization is effected by heating a low molecular weight polyamide (having an intrinsic viscosity of about 0.4 or less) in the absence of oxygen, for example in a carbon dioxide or nitrogen atmosphere, or under reduced pressure, at temperatures below the melting point of said polyamide and continuing heat treatment under these polymerizing conditions until a polymer of the desired molecular weight is obtained. Although polymerization often occurs at temperatures as low as 120° C., it does not occur at an appreciable rate until the temperature reaches 180°. As members of the class of crystalline synthetic linear polyamides preferred for use according to this invention possess melting points above 200° C., solid phase polymerization of such polyamides may be effected at still higher temperatures when a rapid rate of polymerization is desired.

Among other valuable methods for obtaining high molecular weight polyamides in a sufficiently fine state of subdivision for use in my invention may be mentioned a process for projecting a fine spray of molten polyamide into a medium designed to effect rapid cooling without agglomeration of the particles such as a cool inert (non-oxidizing) gas, as nitrogen or carbon dioxide, or a cool inert liquid as water. Another method consists in diluting a solution of a polyamide in a water-miscible solvent, such as formic acid, with water by a process which causes the polyamide to precipitate in the desired finely divided state. It is to be understood that the application of any one or a combination of any of these methods to polyamides modified in any of the ways described in this specification is included in this invention.

As indicated in Example III, softening or plasticizing agents may be used in conjunction with the polyamides, for example, phenolic bodies and aromatic sulfonamides which may act to produce a coating of particular pliability or through their slow volatilization, protect the molten polymer from oxidation at the elevated temperatures required for fusion of the coating. Pigments, dyes, fillers, resins, cellulose derivatives, and other types of crystalline synthetic linear polymers, etc., may also be employed as modifying agents with the limitation that they should possess the required thermal stability. As the fusion of many of the polyamides useful according to this invention requires temperatures above those at which thermal decomposition of many coloring materials occurs, the common ceramic colors are preferred as color-producing modifying agents.

Modified polyamide coatings may be prepared by the incorporation of the modifying agents into the polyamide-forming reactants before polymerization or during any of the steps involved in the preparation of the polyamide for application as a coating upon the object to be coated.

Through such modifications, polyamide coatings prepared by grinding or otherwise reducing the particle size of the polyamide composition may be fused upon the surface of metal objects or ceramic ware to yield coatings varying in color, texture, toughness, water and solvent resistance, melting point, and surface qualities. In addition, if desired, variegated effects may be produced upon a single surface, for example, by projecting several different polyamide coatings upon a metal or ceramic-ware surface according to some predetermined design. Following the application of the coating, subjecting the coated article to fusion conditions will yield coatings possessing attractive and artistic designs, or designs possessing utility as, for example, directional or otherwise informative signs. Further interesting effects may be obtained by mixing polyamide coatings differing for example in color, either before application or simply by applying one upon another in such a manner that a combined effect is exhibited or that the first will show through the second after fusion.

It will be evident from the foregoing description that this invention provides a method for obtaining new and novel coatings over metal and ceramic-ware objects composed of crystalline synthetic linear polymers. Such coatings are superior to vitreous enamels in resistance to shock, and to organic types of coating compositions in toughness, mar resistance, and due to their insolubility, to the action of the common organic solvents. Also, the fusion of the polyamide coatings, as described in this specification, may be completed in a matter of minutes in contrast to the long baking schedules required by the common organic finishes and operates at low temperatures when compared to the firing temperatures required of vitreous enamels. These polyamide coatings may be produced with a variety of effects, i. e., made translucent, opaque or colored, or produced with any desired pattern or mottle, or given any desired finish as, for instance, imitation pearl, tortoise shell and the like.

Polyamide-coated metal sheeting may be successfully shaped or drawn in equipment designed for carrying out such operations upon metal sheeting. For example, thin copper sheeting coated with a layer of polyhexamethylene adipamide according to this invention has been satisfactorily drawn into a cylinder closed at one end by conventional deep-die drawing equipment. This process is well suited to polyamide-coated metal sheeting in view of the "cold drawing" characteristics of polyamides, but when applied to metal sheeting coated with the conventional organic-type finishes usually results in rupturing the coating. The application of die-drawing or die-stamping processes to metal sheeting coated with a polyamide film according to this invention may be utilized to fabricate polyamide-coated cans, trays, food containers, push buttons, automobile accessories, metal cartridge cases, structural and/or decorative parts of radio sets, and the like.

The methods of applying polyamide coatings as detailed in this specification are useful in preparing polyamide-coated wire. For example, the wire may be passed continuously through a water suspension of the finely divided polyamide; the coating may then be dried, fused and quenched. Such a coating is outstanding in its abrasion resistance and possesses good electrical properties. Moreover, polyamide-coated metal is useful in the fabrication of metal furniture, for example, serving as a durable table or desk top; metal benches or seats; the exterior walls of refrigerators and metal cabinets; switch plates; metal doors; counters; interior trim of automobiles, as for example dash-boards; trinkets and ornaments; etc. Polyamide-coated ceramic-ware is particularly useful under conditions of wear which might otherwise result in chipping or other types of surface damage.

As many apparently widely different embodiments of this invention may be made without departing from the spirit and scope thereof, it is to be understood that I do not limit myself to the specific embodiments thereof except as defined in the appended claims.

I claim:

1. A process for obtaining products having an adherent coating of vitreous-like tough enamel resistant to chipping and mechanical shock, said process comprising applying to a hard, heat stable base material a deposit which comprises finely divided crystalline synthetic linear polymeric amide, and heating the base material to a temperature which causes rapid fusion of said deposit to a liquid but which is below the temperature of destructive thermal decomposition of the polymeric amide during said fusion, and then rapidly cooling the fused coating by quenching.

2. A process for obtaining products having an adherent coating of vitreous-like tough enamel resistant to chipping and mechanical shock, said process comprising applying to a hard, heat stable base material a deposit which comprises finely divided crystalline synthetic linear polymeric amide having a melting point above 200° C. and an intrinsic viscosity of at least 0.4, and heating said base material to a temperature which causes rapid fusion of said deposit to a liquid but which is below the temperature of destructive thermal decomposition of the polymeric during said fusion, and then rapidly cooling the fused coating by quenching.

3. The process set forth in claim 1 in which said polymeric amide is the reaction product of a diamine and a dibasic carboxylic acid.

4. The process set forth in claim 1 in which said polymeric amide is that obtained from a polymerizable monoaminomonocarboxylic acid.

5. The process set forth in claim 2 in which said polymeric amide is polyhexamethylene adipamide.

ELMER K. BOLTON.